Patented July 12, 1927.

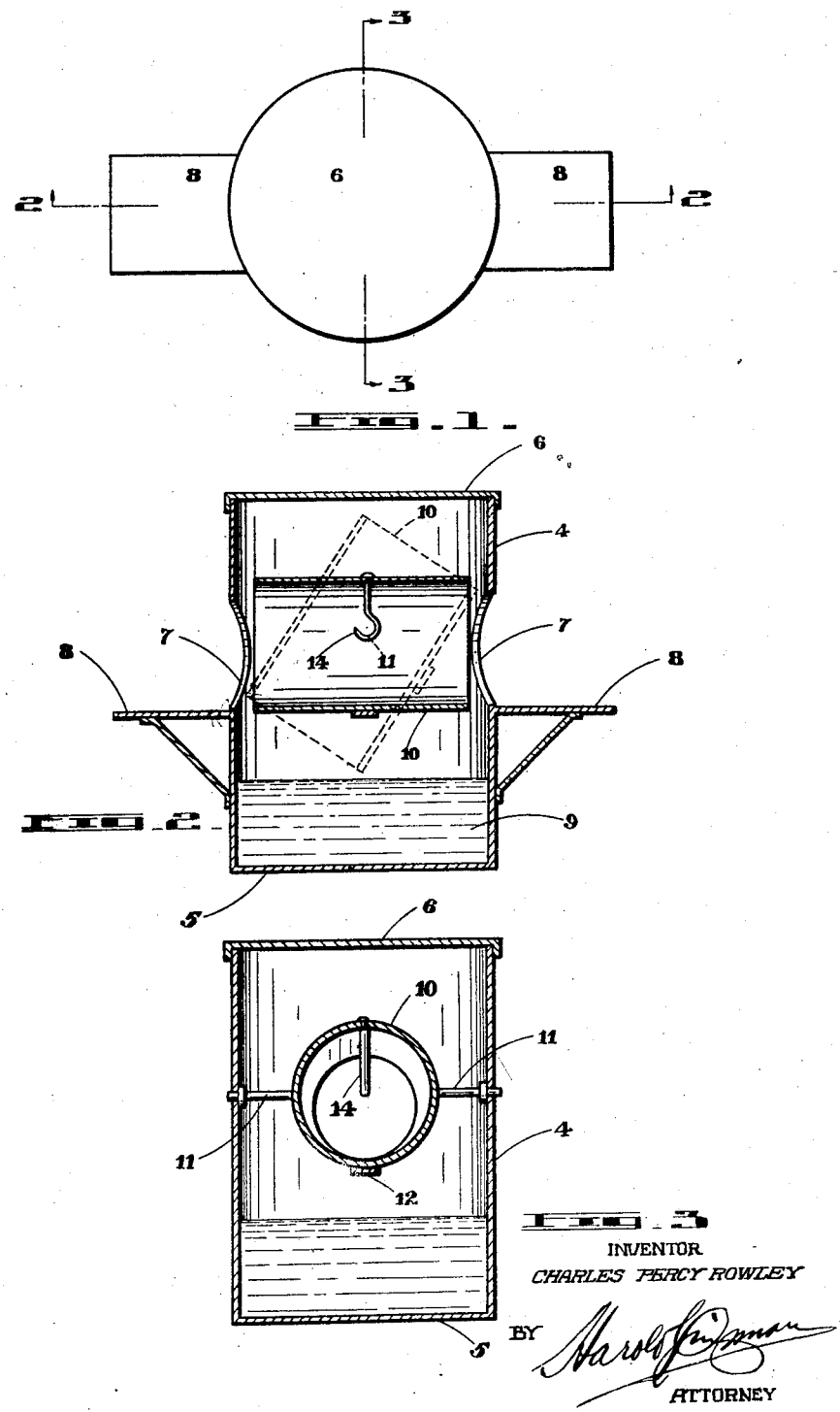

1,635,224

UNITED STATES PATENT OFFICE.

CHARLES PERCY ROWLEY, OF NINETTE, MANITOBA, CANADA.

TRAP.

Application filed August 12, 1924. Serial No. 731,667.

My present invention appertains generally to improvements in the art of traps and specifically to a springless trap particularly adapted to catching mice, rats and like rodents.

The object of the invention is to provide a trap of this character in which a chamber containing the bait is pivotally mounted within a housing provided with openings in each side thereof leading to said pivoted bait chamber, so that when the rodent, attracted by the bait, enters said pivoted bait chamber, the same will tilt under the influence of the weight of the rodent, which drops into the said housing, escape from which is positively precluded by said pivoted bait chamber.

A further object of the invention is to provide a trap of the character stated, employing a centrally pivoted bait chamber, which, when the rodent enters the same, will tilt under the influence of the weight of the rodent, the top of said chamber striking the back of the rodent and forcing the same into the housing beneath said pivoted bait chamber.

Among other aims and objects of my invention may be cited the provision of a trap of this character which is constructed with a view to compactness and durability, wherein the number of parts are few, the construction simple and the cost of production low.

With the foregoing and other objects in view, as will appear as the description proceeds, the invention consists of the novel construction, combination and arrangement of co-operating elements as hereinafter more specifically set forth, claimed and shown in the accompanying drawings forming a part of the present application and in which:

Fig. 1 is a top plan view of my invention.

Fig. 2 is a sectional view taken on the line 2—2 of Fig. 1.

Fig. 3 is a sectional view taken on the line 3—3 of Fig. 1.

Referring more in detail to the drawings in which similar reference characters designate corresponding parts throughout the several views, it will be noted that 4 illustrates a housing having a closed lower end 5 and a removable cover 6. Openings 7 are formed in the housing in opposed relation. The numerals 8 indicate platforms mounted on the side of the housing in alignment with the bottoms of the opening 7 so that the rodent may jump upon either of said platforms and enter either of the openings 7.

A bait chamber 10 is pivoted centrally in the housing 4 by the trunnions 11 which extend through the sides of said housing as shown in Fig. 3. A bait hook 14 is positioned in said cylinder. 12 indicates a counterbalance for returning the same to horizontal position after tilting.

The lower portion of the housing 6 may be filled with water as shown at 9.

The rodent attracted by the bait on the hook 14 within the pivoted bait chamber 10, jumps upon one of the platforms 8 and enters the adjoining opening 7 into the pivoted bait chamber 10, which tilts under the influence of the weight of the rodent, the top of which will strike the same on the back and force it to drop into the water 9 in the lower portion of said housing. When relieved of the weight of the rodent, the counterbalance 12 will serve to swing the pivoted bait chamber back to horizontal position, thus automatically resetting the same for another rodent.

From the foregoing it is obvious that the pivoted bait chamber will serve to continuously trap rodents without interruptions and positively prevent the rodent from clinging to any portion of the trap or escape being trapped once the same has placed its front feet within the pivoted bait chamber 10.

While the preferred embodiment of the invention has been disclosed, it is to be understood that minor changes in the details of construction, combination and arrangement of co-operating elements may be resorted to within the scope of what is claimed without departing from the spirit of the invention.

What I claim as new is:

A trap comprising a housing; openings in the opposite sides of said housing; a tubular member open at each end and pivotally mounted intermediate its ends in said housing; the opposite ends of said tubular member being normally in alignment with and in close proximity to said openings in said housing; said housing covering said tubular member to prevent animals from touching said tubular member except through said openings; said tubular member, when turned on its pivotal mounting, closing off retreat through said openings; and a means carried by said tubular member for automatically returning the same to its normal position.

In testimony whereof, I affix my signature.

CHARLES PERCY ROWLEY.